(12) United States Patent
Taherzadeh Boroujeni et al.

(10) Patent No.: US 12,108,384 B2
(45) Date of Patent: Oct. 1, 2024

(54) UPLINK CONTROL CHANNEL REPETITION FACTOR INDICATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(*) Notice: Subject to any disclaimer, the term of this patent is extended or adjusted under 35 U.S.C. 154(b) by 116 days.

(21) Appl. No.: 17/396,319

(22) Filed: Aug. 6, 2021

(65) Prior Publication Data

US 2023/0042237 A1 Feb. 9, 2023

(51) Int. Cl.
| | | |
|---|---|---|
| H04L 27/26 | (2006.01) | |
| H04L 1/18 | (2023.01) | |
| H04L 1/1867 | (2023.01) | |
| H04W 72/12 | (2023.01) | |
| H04W 72/1268 | (2023.01) | |
| H04W 72/23 | (2023.01) | |
| H04W 72/54 | (2023.01) | |

(52) U.S. Cl.
CPC ....... *H04W 72/1268* (2013.01); *H04L 1/1896* (2013.01); *H04L 27/2607* (2013.01); *H04W 72/23* (2023.01); *H04W 72/54* (2023.01)

(58) Field of Classification Search
None
See application file for complete search history.

(56) References Cited

U.S. PATENT DOCUMENTS

| | | | |
|---|---|---|---|
| 2021/0337538 A1* | 10/2021 | Li | H04L 5/0057 |
| 2022/0287068 A1* | 9/2022 | Lin | H04W 72/23 |
| 2022/0361164 A1* | 11/2022 | Li | H04L 1/08 |

* cited by examiner

*Primary Examiner* — Hong Shao

(57) ABSTRACT

Certain aspects of the present disclosure provide techniques for wireless communications by a user equipment (UE) includes receiving a downlink control information (DCI) scheduling a downlink transmission for the UE, the DCI comprising a physical uplink control channel (PUCCH) resource indicator (PRI) indicating an uplink resource for the UE to use to transmit feedback information regarding the downlink transmission; and transmitting, repeatedly a number of times, uplink control information different than the feedback information regarding the downlink transmission, wherein the number of times is based on the PRI.

17 Claims, 10 Drawing Sheets

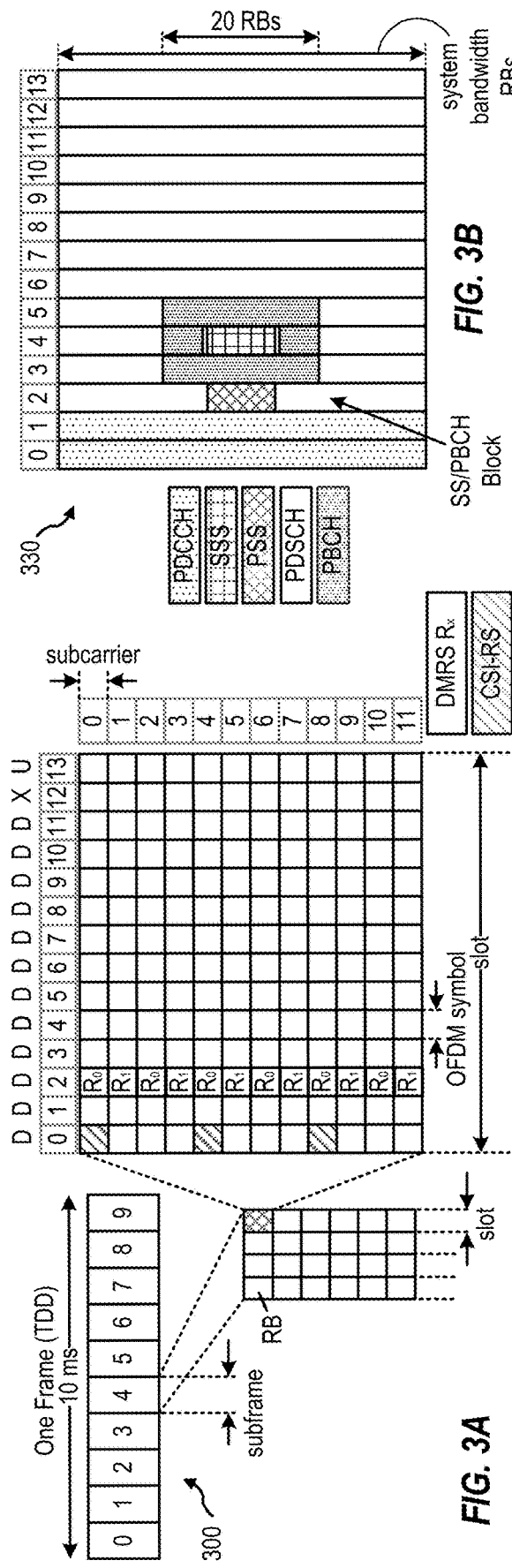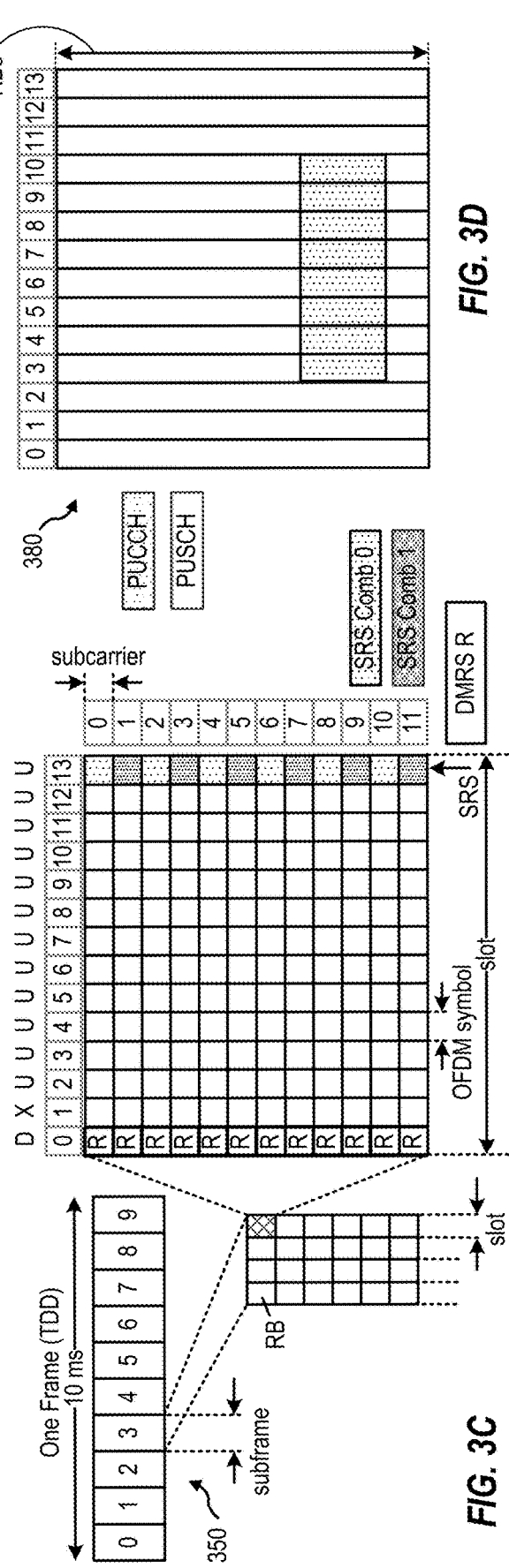

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

| PUCCH Resource Index | PUCCH Repetition Factor |
|---|---|
| 1 | PR1 |
| 2 | PR2 |
| 3 | PR3 |
| ... | |
| N | PRN |

*FIG. 5*

UPLINK CONTROL CHANNEL REPETITION FACTOR INDICATION

Aspects of the present disclosure relate to wireless communications, and more particularly, to techniques for configuring a repetition factor for uplink control channel communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes receiving a downlink control information (DCI) scheduling a downlink transmission for the UE, the DCI comprising a physical uplink control channel (PUCCH) resource indicator (PRI) indicating an uplink resource for the UE to use to transmit feedback information regarding the downlink transmission; and transmitting, repeatedly a number of times, uplink control information different than the feedback information regarding the downlink transmission, wherein the number of times is based on the PRI.

In one aspect, a method for wireless communications by a network entity includes transmitting a DCI scheduling a downlink transmission for a UE, the DCI comprising a PRI indicating an uplink resource for the UE to use to transmit feedback information regarding the downlink transmission; and receiving, repeatedly a number of times, uplink control information different than the feedback information regarding the downlink transmission, wherein the number of times is based on the PRI.

In one aspect, a UE comprises a memory and a processor coupled to the memory, the processor and the memory configured to receive a DCI scheduling a downlink transmission for the UE, the DCI comprising a PRI indicating an uplink resource for the UE to use to transmit feedback information regarding the downlink transmission; and transmit, repeatedly a number of times, uplink control information different than the feedback information regarding the downlink transmission, wherein the number of times is based on the PRI.

In one aspect, a BS comprises a memory and a processor coupled to the memory, the processor and the memory configured to transmit a DCI scheduling a downlink transmission for a UE, the DCI comprising a PRI indicating an uplink resource for the UE to use to transmit feedback information regarding the downlink transmission; and receive, repeatedly a number of times, uplink control information different than the feedback information regarding the downlink transmission, wherein the number of times is based on the PRI.

In one aspect, non-transitory computer readable storage medium comprises instructions that, when executed by one or more processors of a UE, cause the UE to receive a DCI scheduling a downlink transmission for the UE, the DCI comprising a PRI indicating an uplink resource for the UE to use to transmit feedback information regarding the downlink transmission; and transmit, repeatedly a number of times, uplink control information different than the feedback information regarding the downlink transmission, wherein the number of times is based on the PRI.

In one aspect, non-transitory computer readable storage medium comprises instructions that, when executed by one or more processors of a BS, cause the BS to transmit a DCI scheduling a downlink transmission for a UE, the DCI comprising a PRI indicating an uplink resource for the UE to use to transmit feedback information regarding the downlink transmission; and receive, repeatedly a number of times, uplink control information different than the feedback information regarding the downlink transmission, wherein the number of times is based on the PRI.

In one aspect, a UE comprises means for receiving a DCI scheduling a downlink transmission for the UE, the DCI comprising a PRI indicating an uplink resource for the UE to use to transmit feedback information regarding the downlink transmission; and means for transmitting, repeatedly a number of times, uplink control information different than the feedback information regarding the downlink transmission, wherein the number of times is based on the PRI.

In one aspect, a BS comprises means for transmitting a DCI scheduling a downlink transmission for a UE, the DCI comprising a PRI indicating an uplink resource for the UE to use to transmit feedback information regarding the downlink transmission; and means for receiving, repeatedly a number of times, uplink control information different than the feedback information regarding the downlink transmission, wherein the number of times is based on the PRI.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 4 is a table illustrating example physical uplink control channel (PUCCH) resource sets, in accordance with aspects of the present disclosure.

FIG. 5 depicts a mapping of PUCCH resources to PUCCH repetition factors.

DETAILED DESCRIPTION

Figure 1:
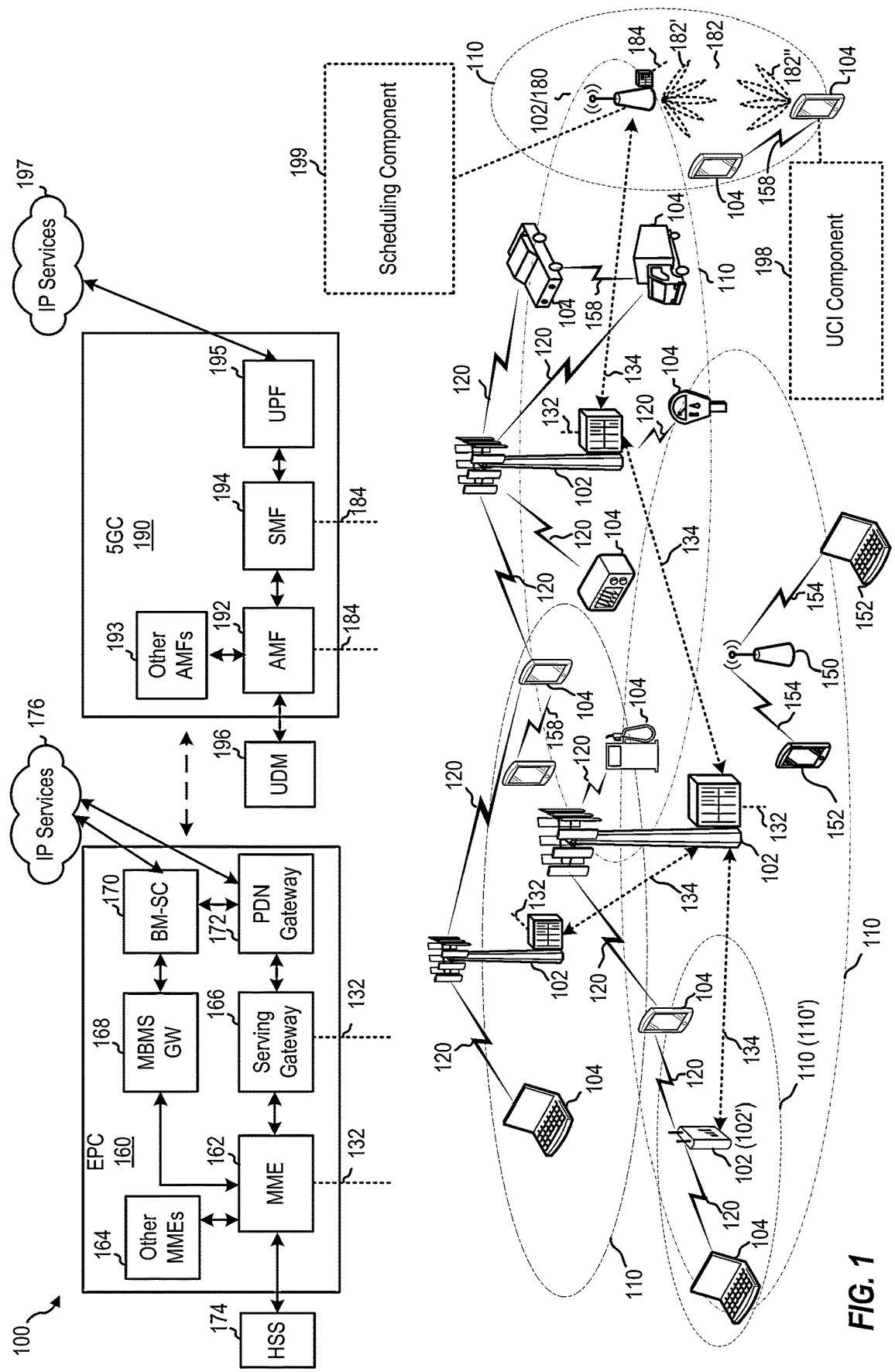
FIG. 1 is a block diagram conceptually illustrating an example wireless communication network.

Aspects of the present disclosure provide apparatuses, methods, processing systems, and computer-readable mediums for dynamic uplink control channel repetition factor indication. In certain aspects, an uplink control channel comprises a physical uplink control channel (PUCCH). Though certain aspects are described with respect to PUCCH, for example as used in 3GPP 5G NR standards, the aspects may be applicable to any suitable uplink control channel communication.

In certain aspects, a user equipment (UE) is configured to transmit uplink control information (UCI) in a PUCCH to a base station (BS). For example, the UE may be configured to utilize one or more resources (e.g., time-frequency resources, such as PUCCH resources) on an uplink to transmit UCI to the BS. In certain aspects, the UE is configured to use repetition to transmit the UCI to the BS multiple times, such as to aid in reliability of communication of the UCI between the UE and the BS.

In certain aspects, there are different categories of UCI. One category of UCI may be UCI that is associated with (e.g., scheduled by) downlink control information (DCI). For example, one type of such category of UCI includes feedback information for a downlink transmission (e.g., a physical downlink shared channel (PDSCH)) from the BS to the UE that is dynamically scheduled by the BS. For example, the BS may transmit DCI in a downlink control channel (e.g., a physical downlink control channel (PDCCH)) that schedules transmission of the downlink transmission (e.g., indicates time-frequency resources used for transmission of the downlink transmission). In certain aspects, the DCI also include a PUCCH resource indicator (PRI) that indicates a PUCCH resource (e.g., of a PUCCH resource set comprising a plurality of PUCCH resources) to use for transmitting the feedback information for the downlink transmission. The feedback information may be positive acknowledgement (ACK) feedback indicating the downlink transmission was successfully received and decoded by the UE and/or negative acknowledgement (NACK) feedback indicating the downlink transmission was not successfully received and decoded by the UE.

Another category of UCI may be UCI that is not associated with (e.g., scheduled by) a DCI. For example, one type of such category of UCI includes feedback information (e.g., ACK/NACK) for a downlink transmission (e.g., a PDSCH) from the BS to the UE that is scheduled using semi-persistent scheduling (SPS) by the BS. For example, the BS may transmit radio resource control (RRC) signaling to the UE that schedules transmission of downlink transmissions semi-persistently. The BS may also transmit in the same or different RRC signaling to the UE, scheduling of corresponding semi-persistent PUCCH resources for the UE to use for transmitting feedback for the downlink transmissions. SPS of a communication (e.g., downlink transmission) may refer to resources that are scheduled periodically in time for the communication, wherein the scheduling is valid until a timer expires and/or a new SPS scheduling configuration is received by the UE for the communication.

Another type of UCI that is not associated with a DCI includes a channel state information (CSI) report. The CSI report may indicate quality of a channel as measured by the UE. For example, the BS may transmit RRC signaling to the UE that schedules one or more PUCCH resources for the UE to use to transmit one or more CSI reports. Such scheduling may be, for example, periodic (referred to as periodic CSI or P-CSI) or semi-persistent (referred to as semi-persistent CSI or SP-CSI).

Another type of UCI that is not associated with a DCI includes a scheduling request (SR). The SR may be a request by the UE for an uplink grant of one or more resources for uplink transmission on an uplink data channel (e.g., a physical uplink shared channel (PUSCH)). For example, the BS may transmit RRC signaling to the UE that configures one or more PUCCH resources for the UE to use to transmit one or more SR.

In certain aspects, the BS configures the UE with a PUCCH repetition factor per PUCCH resource (or alternatively per PUCCH resource set), such as using RRC signaling transmitted to the UE. For example, the BS may indicate a mapping of PUCCH repetition factors to PUCCH resources. The PUCCH repetition factor may indicate a number of times to repeat transmission of a PUCCH transmission associated with (e.g., scheduled by) a DCI. For example, as discussed, a DCI may include a PRI that indicates a PUCCH resource (e.g., periodically occurring) to use to transmit feedback information for a downlink transmission scheduled by the DCI. The PUCCH resource indicated by the PRI may be mapped to a PUCCH repetition factor indicating a number of times to repeat transmission. Accordingly, the UE may repeatedly transmit the feedback information for the downlink transmission scheduled by the DCI the number of times indicated by the PUCCH repetition factor associated with the PUCCH resource indicated by the PRI in the DCI. Thus, for such UCI/PUCCH resources explicitly scheduled/indicated by the DCI, the PRI may explicitly indicate a PUCCH repetition factor to use.

However, in certain aspects, the PRI in a DCI may not explicitly indicate a PUCCH repetition factor to use for UCI this is not associated with a DCI. Accordingly, certain aspects herein provide techniques for using the PRI in a DCI to implicitly indicate a PUCCH repetition factor to use for one or more UCI not associated with the DCI. Such techniques allow for dynamic indication of PUCCH repetition factor via DCI for UCI that is not associated with a DCI, which may provide greater flexibility than indication of PUCCH repetition factor in a more persistent manner (e.g., using RRC signaling). Further, such implicit indication of PUCCH repetition factor to use for one or more UCI not associated with the DCI may more efficiently utilize communication resources by not requiring an explicit indication be further transmitted, thereby increasing throughput.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes scheduling component 199, which may be configured to transmit DCI scheduling downlink transmission and including a PRI indicating an uplink resource to use for communication of feedback information for the downlink transmission. Wireless network 100 further includes UCI component 198, which may be used configured to transmit UCI not associated with a DCI a number of times that is based on PRI included in the DCI.

Figure 2:
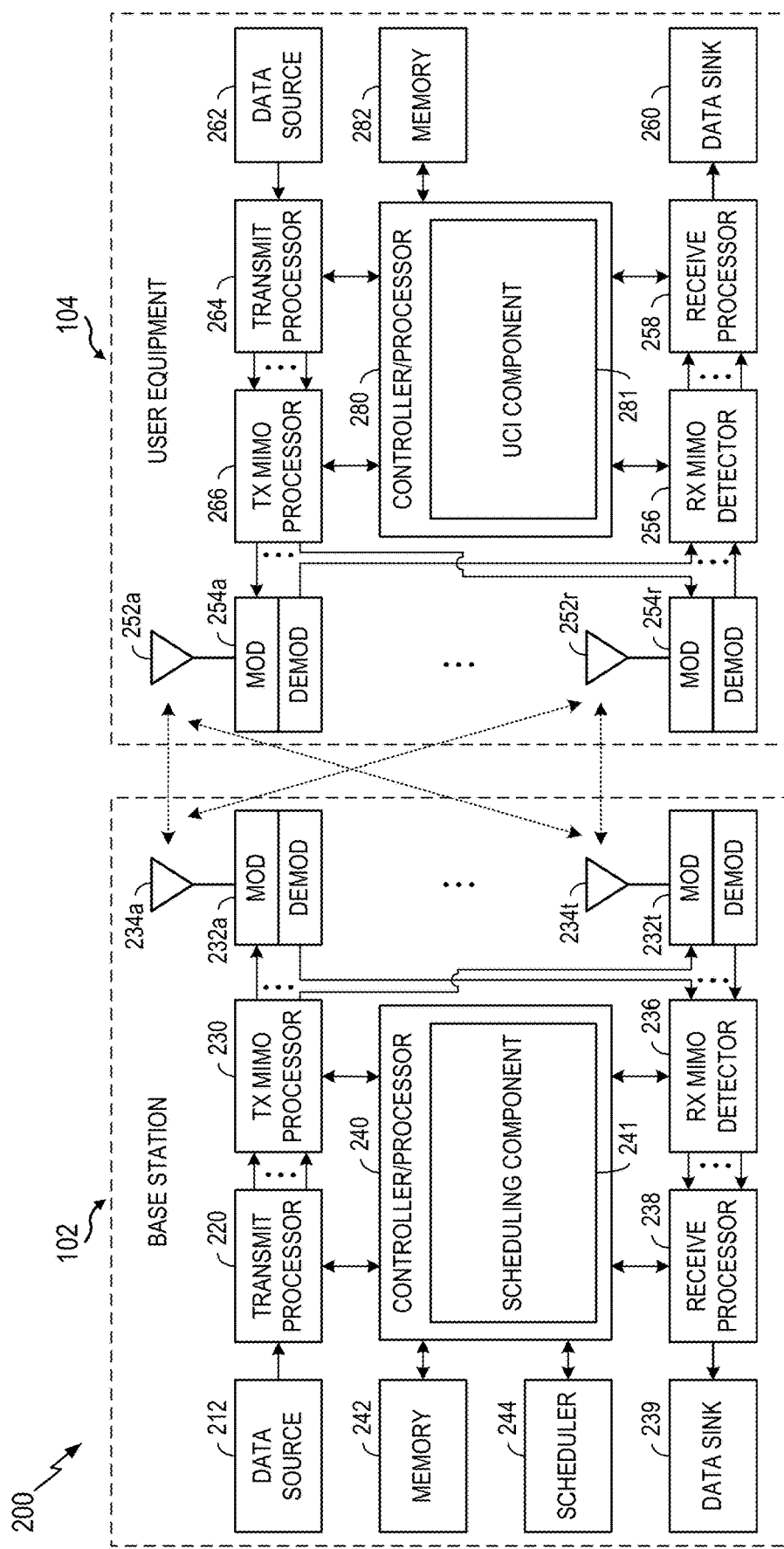
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes scheduling component 241, which may be representative of scheduling component 199 of FIG. 1. Notably, while depicted as an aspect of controller/processor 240, scheduling component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes UCI component 281, which may be representative of UCI component 198 of FIG. 1. Notably, while depicted as an aspect of controller/processor 280, UCI component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

In some cases, a UE may use a PUCCH resource from a common PUCCH resource set. For example, the UE may be configured with a set of common PUCCH resources. One example of a set of common PUCCH resources is in IEEE TS 38.213 v16.50, Table 9.2.1-1, shown in Table 400 in FIG. 4. A PUCCH resource set may include a PUCCH format, a first symbol index, a number of symbols, a PRB offset value, and a set of initial cyclic shift (CS) indexes. In the example illustrated in Table 400, the common PUCCH resource set may be indexed (e.g., 0-15), and each index value for a row in the Table 400 includes a corresponding PUCCH format, first symbol index, number of symbols, PRB offset, and set of initial CS indexes. The PRB offset may be a parameter $RB_{BWP}^{offset}$. The number of CSs in the sets, $N_{CS}$, may be different, as shown in Table 400.

In some cases, prior to radio resource control (RRC) configuration, a set of cell-specific PUCCH resources are configured via system information block (SIB) Type 1 (e.g., SIB1) for the initial uplink bandwidth part (e.g., the initial BWP of the primary serving cell (PCell)) having $N_{BWP}^{size}$ PRBs. For example, a parameter (e.g., the parameter pucch-ResourceCommon) in SIB1 can indicate the set of cell-specific resources. The parameter may be a value between [0,15] pointing to a row index of the table 400. The SIB1 may be sent after SSB containing the PBCH with the MIB.

In some cases, prior to UE-specific dedicated RRC configuration (e.g., provided by PUCCH-ResourceSet in PUCCH-Config), the UE can use a PUCCH resource from the indicated common PUCCH resource set to send uplink information, such as hybrid automatic repeat request (HARQ) acknowledgment (ACK) information. For example, the BS can send downlink control information (DCI) to the UE with information used by the UE to derive the PUCCH resource form the PUCCH resource set. For example, during initial access, the BS may send the UE a DCI format 1_0 to schedule an ACK to a Msg4 transmission. The DCI may include a 3-bit PUCCH resource indicator (PRI) field. The UE can use the value of the PRI bits to derive the PUCCH resource.

To determine the PUCCH resource, the UE may determine a PUCCH resource index $\gamma_{PUCCH}$. In the example of sixteen PUCCH resource sets, as shown in Table 400, $0 \leq \gamma_{PUCCH} \leq 15$. The can determine $N_{CCE,0}$ as:

$$\gamma_{PUCCH} = \left\lfloor \frac{2 \cdot n_{CCE,0}}{N_{CCE,0}} \right\rfloor + 2 \cdot PRI \qquad \text{Eq. 1}$$

where $\gamma_{PUCCH}$ is the PUCCH resource index, $N_{CCE,0}$ is a number of control channel element (CCEs) in a control resource set (CORESET) in which the PDCCH with the DCI is received, $n_{CCE,0}$ is the index of the first CCE of the PDCCH, and PRI is a value of the PUCCH resource indicator field in the DCI.

If $\gamma_{PUCCH} < 8$, the UE may determine the PRB index in the first PUCCH symbol as:

$$RB_{BWP}^{offset} + \left\lfloor \frac{\gamma_{PUCCH}}{N_{CS}} \right\rfloor \qquad \text{Eq. 2}$$

If $\gamma_{PUCCH} < 8$, the UE may determine the PRB index in the second PUCCH symbol as:

$$N_{BWP}^{size} - 1 - RB_{BWP}^{offset} + \left\lfloor \frac{\gamma_{PUCCH}}{N_{CS}} \right\rfloor \qquad \text{Eq. 3}$$

where $RB_{BWP}^{size}$ is a number of PRBs in the configured bandwidth.

If $\gamma_{PUCCH} \leq 8$, the UE may determine the PRB index in the first PUCCH symbol as:

$$N_{BWP}^{size} - 1 - RB_{BWP}^{offset} - \left\lfloor \frac{\gamma_{PUCCH} - 8}{N_{CS}} \right\rfloor \qquad \text{Eq. 4}$$

If $\gamma_{PUCCH} \geq 8$, the UE may determine the PRB index in the second PUCCH symbol as:

$$RB_{BWP}^{offset} + \left\lfloor \frac{\gamma_{PUCCH} - 8}{N_{CS}} \right\rfloor \qquad \text{Eq. 5}$$

The UE also determines an initial CS, from the set of initial CSs. If $\gamma_{PUCCH} < 8$, the UE determine the initial CS as:

$$\gamma_{PUCCH} \bmod N_{CS} \qquad \text{Eq. 6}$$

If $\gamma_{PUCCH} \geq 8$, the UE may determine the initial CS as:

$$(\gamma_{PUCCH} - 8) \bmod N_{CS} \qquad \text{Eq. 7}$$

Aspects Related to Dynamic Uplink Control Channel Repetition Factor Indication

FIG. 5 depicts a mapping 500 of PUCCH resources to PUCCH repetition factors. As discussed, each PUCCH resource, such as of a PUCCH resource set comprising a plurality of PUCCH resources, is associated with a PUCCH repetition factor. For example, mapping 500 may correspond to a mapping of PUCCH resources to PUCCH repetition factors for a PUCCH resource set. As shown, the PUCCH resource of the PUCCH resource set indicated by PUCCH index value 1 is mapped to PUCCH repetition factor PR1. In an example, PR1 has a value of X, where X is an integer and indicates a number of repetitions for a UE to use for transmitting UCI associated with a DCI including a PRI that indicates the PUCCH resource indicated by PUCCH index value 1. In certain aspects, BS 102 configures the UE 104 with the mapping 500, such as by transmitting the mapping 500 to the UE 104 via RRC signaling.

In certain aspects, a PUCCH resource set recurs in time, such as periodically or semi-persistently. For example, the PUCCH resource set may recur at time periods 0, 1, . . . N, where N is an integer. The time periods may refer to any suitable time periods, such as frames, subframes, slots, mini-slots, resource blocks (RBs), etc. Thus, in certain aspects, an identified PUCCH resource in a PUCCH resource set may also recur in time. Therefore, in certain aspects, a PRI that indicates a PUCCH resource indicates the PUCCH resource at one or more time periods. Accordingly, repetition of transmission of UCI on a PUCCH resource indicated by a PRI may refer to repetition of transmission of the UCI on a plurality of recurrences of the PUCCH resource over a plurality of time periods. A PUCCH resource may refer to one or more resources in frequency and time, such as a resource element (RE), RB, intersection of a symbol and tone, etc.

As discussed, in certain aspects, the PRI in a DCI may not explicitly indicate a PUCCH repetition factor to use for UCI that is not associated with a DCI (which may also refer to PUCCH that is not associated with a DCI). Accordingly, certain aspects herein provide techniques for using the PRI in a DCI to implicitly indicate a PUCCH repetition factor to use for one or more UCI not associated with the DCI.

In certain aspects, the PRI in a DCI may be used as a dynamic indication of a PUCCH repetition factor for semi-static PUCCH (e.g., UCI), such as PUCCH associated with SPS PDSCH, P-CSI, or SP-CSI, as discussed.

In certain aspects, a PUCCH resource for transmitting feedback information for a PDSCH indicated by a PRI in a DCI scheduling the PDSCH may be used for transmitting all PUCCHs (e.g., all UCI) associated with the same PUCCH resource set as the PUCCH resource indicated by the PRI. For example, in certain aspects, the UE 104 may be configured, such as using RRC signaling from the BS 102, to indicate an association between one or more types of UCI not associated with a DCI and a PUCCH resource set. Accordingly, when the UE 104 receives the DCI including the PRI indicating the PUCCH resource, the UE 104 determines to which PUCCH resource set the PUCCH resource indicated by the PRI belongs. In certain aspects, the UE 104 further transmits any UCI not associated with the DCI that is associated with that PUCCH resource set in the PUCCH resource (e.g., in a different recurrence of the PUCCH resource) indicated by the PRI using the repetition factor of the PUCCH resource indicated by the PRI. In certain other aspects, the UE 104 is configured, such as by the BS 102 in RRC signaling, with an association between one or more types of UCI not associated with a DCI and particular one or more PUCCH resources in the PUCCH resource set that may be different than the PUCCH resource indicated by the PRI. In certain such aspects, the UE 104 may further transmit any UCI not associated with the DCI that is associated with that PUCCH resource set in its associated one or more PUCCH resources using the repetition factor of the PUCCH resource indicated by the PRI.

In certain aspects, the UE 104 is configured, such as by the BS 102 using RRC signaling, with one or more configurations or rules, or mappings, for using the PRI in a DCI scheduling a PDSCH to determine a repetition factor for one or more other PUCCHs (e.g., one or more UCI not associated with the DCI). For example, a configuration may indicate an operation to perform on the repetition factor associated with the PUCCH resource indicated by the PRI, such as a scaling factor or cyclic shift/offset. In another example, the configuration may indicate a mapping to perform on the repetition factor, such as x to y. For example, if the repetition factor associated with the PUCCH resource indicated by the PRI is 2, the configuration may indicate to perform a cyclic offset of 3, such that the resulting repetition factor of 5 is used for the UCI not associated with DCI. In certain aspects, the configuration for using the PRI is for UCI not associated with DCI that is associated with a same PUCCH resource set as the PUCCH resource indicated by the PRI. In certain aspects, the configuration for using the PRI is for UCI not associated with DCI that is associated with any PUCCH resource set. In certain aspects, the same configuration may be configured for different types of UCI not associated with the DCI. In certain aspects, different configurations may be configured for different types of UCI not associated with the DCI. For example, in certain aspects, a configuration to use for UCI including feedback for SPS PDSCH may be received as part of a SPS configuration received from the BS 102. In another example, in certain aspects, a configuration to use for UCI including P-CSI or SP-CSI may be received as part of a CSI report setting.

In certain aspects, the UE 104 is configured, such as by the BS 102 using RRC signaling, to use a PRI in a DCI scheduling a PDSCH (where the PRI indicates a first PUCCH resource in a first PUCCH resource set) to determine a second PUCCH resource in a second PUCCH resource set different than the first PUCCH resource set. The second PUCCH resource may then be used to transmit UCI/PUCCH not associated with the DCI. The UCI not associated with the DCI may be transmitted using a repetition factor associated with the second PUCCH resource. In certain aspects, the UE 104 is configured to use the same index value of the first PUCCH resource within the first PUCCH resource set to determine the second PUCCH resource in the second PUCCH resource set. For example, if the index value of the PRI is x, the first PUCCH resource is the x PUCCH resource in the first PUCCH resource set and the second PUCCH resource is the x PUCCH resource in the second PUCCH resource set. In certain aspects, the UE 104 is configured to use a function or mapping of the index value of the first PUCCH resource within the first PUCCH resource set to determine the second PUCCH resource in the second PUCCH resource set. For example, if the index value of the PRI is x, and the function is f(i)=i+3, the first PUCCH resource is the x PUCCH resource in the first PUCCH resource set and the second PUCCH resource is the x+3 PUCCH resource in the second PUCCH resource set. As another example, if the index value of the PRI is x, and the mapping maps x to y, the first PUCCH resource is the x PUCCH resource in the first PUCCH resource set and the second PUCCH resource is the y PUCCH resource in the second PUCCH resource set.

In certain aspects, the UE 104 may be configured to use different techniques as described herein for using the PRI in a DCI to implicitly indicate a PUCCH repetition factor for different types of UCI not associated with DCI.

In certain aspects, the UE 104 is configured to use the repetition factor implicitly determined based on PRI (e.g., using any one or more of the techniques discussed) for one or more UCI not associated with DCI semi-persistently, such as until a new overriding indication of repetition factor (e.g., new PRI) is received or until a timer expires.

Figure 6:
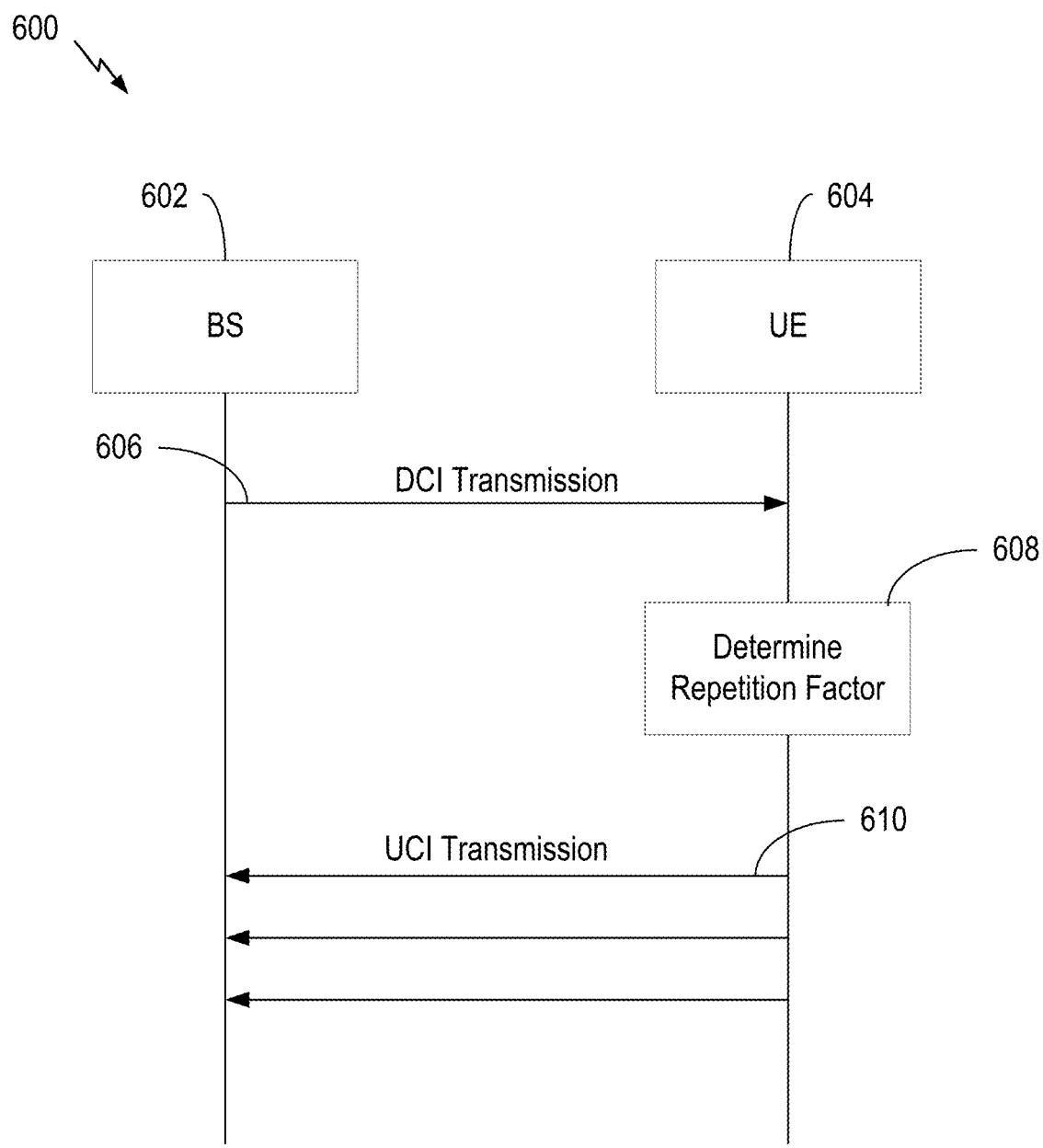
FIG. 6 depicts a call flow diagram for communication of PUCCH between a user equipment and a base station.

FIG. 6 depicts a call flow diagram 600 for communication of PUCCH/UCI not associated with DCI between a UE 604 (e.g., corresponding to UE 104 of FIG. 1) and a BS 602 (e.g., corresponding to BS 102 of FIG. 1).

At 606, the BS 602 transmits a DCI to UE 604. In certain aspects, the DCI schedules a downlink transmission (e.g., PDSCH) for the UE 604. For example, the DCI indicates one or more time-frequency resources for the UE 604 to receive a downlink transmission transmitted by the BS 602 to the UE 604. In certain aspects, the DCI further indicates a PRI that indicates an uplink channel resource (e.g., a time-frequency resource, a PUCCH resource, etc.) for the UE 604 to use to transmit feedback information regarding the downlink transmission to the BS 602.

At 608, based implicitly on the PRI as discussed, the UE 604 determines a repetition factor to utilize for transmitting UCI/PUCCH not associated with the DCI to the BS 602.

At 610, the UE 604 transmits, a number of times based on the determined repetition factor, the UCI/PUCCH not associated with the DCI to the BS 602.

Example Methods

Figure 7:
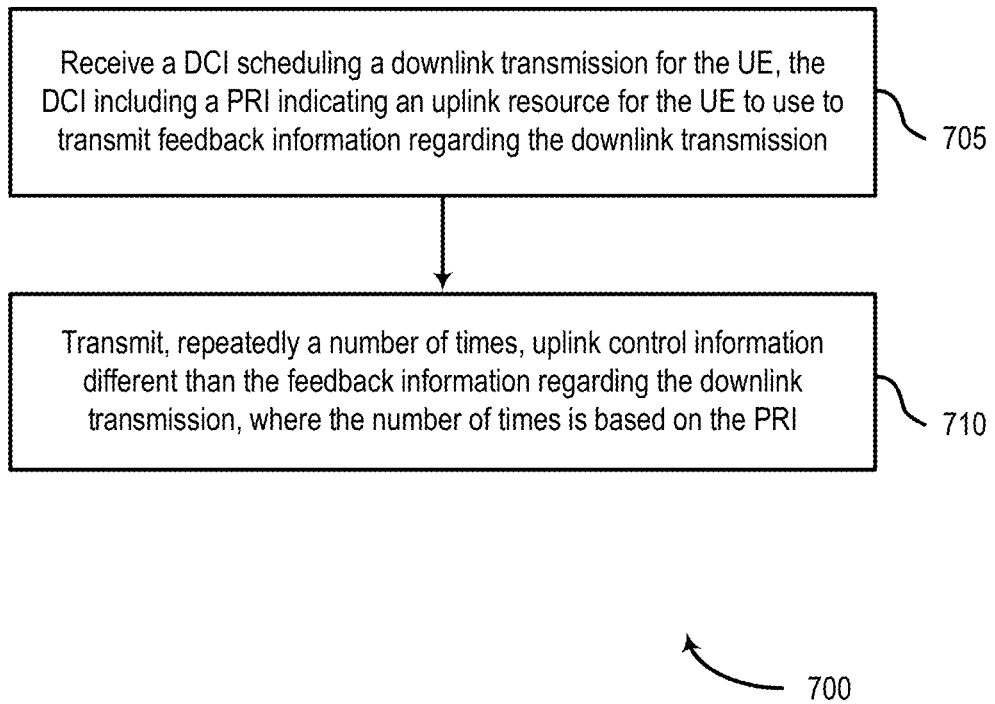
FIGS. 7 and 8 show example methods for uplink control channel repetition factor indication according to aspects of the present disclosure.

FIG. 7 shows an example of a method 700 for uplink control channel repetition factor indication according to aspects of the present disclosure. In some aspects, a user equipment, such as UE 104 of FIGS. 1 and 2, or processing system 905 of FIG. 9, may perform the method 700.

At operation 705, the system receives a DCI scheduling a downlink transmission for the UE, the DCI including a PRI indicating an uplink resource for the UE to use to transmit feedback information regarding the downlink transmission. In some cases, the operations of this step refer to, or may be performed by, DCI circuitry as described with reference to FIG. 9.

At operation 710, the system transmits, repeatedly a number of times, uplink control information different than the feedback information regarding the downlink transmission, where the number of times is based on the PRI. In some cases, the operations of this step refer to, or may be performed by, uplink control information circuitry as described with reference to FIG. 9.

In some aspects, the number of times is associated with the uplink resource and the number of times is based on the PRI based on the uplink control information being associated with a same PUCCH resource set as the uplink resource indicated by the PRI.

In some aspects, the method 700 includes receiving a configuration associated with the uplink control information, wherein the number of times is further based on the configuration associated with the uplink control information. In some aspects, the configuration is one of SPS configuration or CSI report setting. In some aspects, the configuration indicates an operation to apply to the PRI, wherein a result of the operation indicates a second uplink resource for transmitting the uplink control information, and wherein the number of times is based on the PRI based on the second uplink resource being associated with the number of times. In some aspects, the operation comprises a cyclic shift.

In some aspects, the uplink resource is associated with a first PUCCH resource set, the uplink control information is associated with a second PUCCH resource set, the PRI further comprises an index value, the index value is associated with the uplink resource in the first PUCCH resource set, and the index value is associated with a second uplink resource for transmitting the uplink control information in the second PUCCH resource set. In some aspects, the number of times is based on the PRI based on the number of times being associated with the second uplink resource.

In some aspects, the first PUCCH resource set comprises a first plurality of uplink resources ordered by index value and the second PUCCH resource set comprises a second plurality of uplink resources ordered by index value. In some aspects, the uplink resource has a same relative index position in the first PUCCH resource set as the second uplink resource has in the second PUCCH resource set.

In some aspects, the first PUCCH resource set comprises a first plurality of uplink resources ordered by index value and the second PUCCH resource set comprises a second plurality of uplink resources ordered by index value, and the uplink resource has a different relative index position in the first PUCCH resource set as the second uplink resource has in the second PUCCH resource set.

In some aspects, the method 700 includes receiving a configuration associating the second uplink resource with the index value.

In some aspects, the uplink resource is associated with a second number of times, and wherein the number of times is based on the second number of times. In some aspects, the method 700 includes receiving a configuration indicating a scaling factor to apply to the second number of times to derive the number of times.

In some aspects, the method 700 includes applying the number of times for repetition of transmissions for a configured time period or until a new configuration for repetition of transmissions is received.

Figure 8:
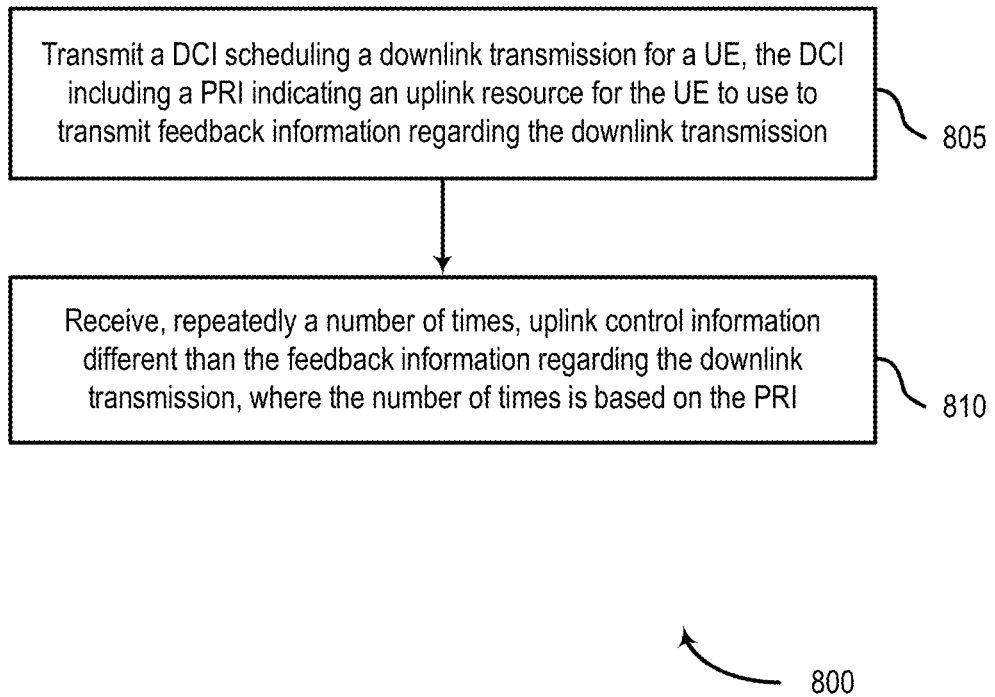

FIG. 8 shows an example of a method 800 for uplink control channel repetition factor indication according to aspects of the present disclosure. In some aspects, a base station, such as base station 102 of FIGS. 1 and 2, or processing system 1005 of FIG. 10, may perform the method 800.

At operation 805, the system transmits a DCI scheduling a downlink transmission for a UE, the DCI including a PRI indicating an uplink resource for the UE to use to transmit feedback information regarding the downlink transmission. In some cases, the operations of this step refer to, or may be performed by, UE DCI circuitry as described with reference to FIG. 10.

At operation 810, the system receives, repeatedly a number of times, uplink control information different than the feedback information regarding the downlink transmission, where the number of times is based on the PRI. In some cases, the operations of this step refer to, or may be performed by, UE uplink control information circuitry as described with reference to FIG. 10.

In some aspects, the number of times is associated with the uplink resource, and wherein the number of times is based on the PRI based on the uplink control information being associated with a same PUCCH resource set as the uplink resource indicated by the PRI.

In some aspects, the method 800 includes transmitting a configuration associated with the uplink control information, wherein the number of times is further based on the configuration associated with the uplink control information. In some aspects, the configuration is one of SPS configuration or CSI report setting. In some aspects, the configuration indicates an operation to apply to the PRI, wherein a result of the operation indicates a second uplink resource for transmitting the uplink control information, and wherein the number of times is based on the PRI based on the second uplink resource being associated with the number of times. In some aspects, the operation comprises a cyclic shift.

In some aspects, the uplink resource is associated with a first PUCCH resource set, wherein the uplink control information is associated with a second PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

In some aspects, the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

In some aspects, the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

In some aspects, the method 800 includes transmitting a configuration associating the second uplink resource with the index value.

In some aspects, the uplink resource is associated with a second number of times, and wherein the number of times is based on the second number of times. In some aspects, the method 800 includes transmitting a configuration indicating a scaling factor to apply to the second number of times to derive the number of times.

Example Wireless Communication Device

Figure 9:
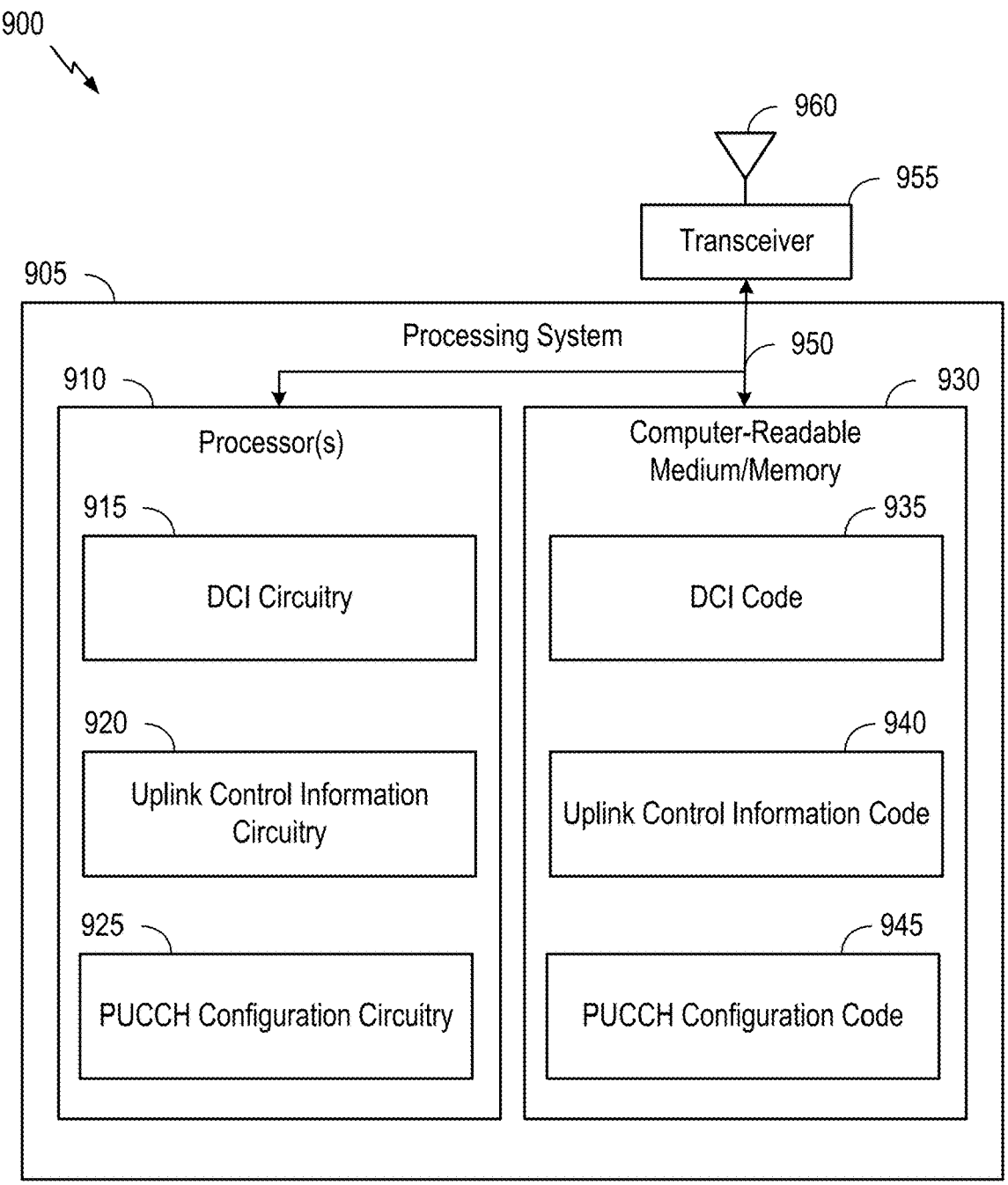
FIGS. 9 and 10 show example of communications devices according to aspects of the present disclosure.

FIG. 9 depicts an example communications device 900 that includes various components operable, configured, or adapted to perform operations for the techniques disclosed herein, such as the operations depicted and described with respect to FIGS. 6 and/or 7. In some examples, communication device may be a user equipment 104 as described, for example with respect to FIGS. 1 and 2.

Communications device 900 includes a processing system 905 coupled to a transceiver 955 (e.g., a transmitter and/or a receiver). Transceiver 955 is configured to transmit (or send) and receive signals for the communications device 900 via an antenna 960, such as the various signals as described herein. A transceiver 955 may communicate bi-directionally, via antennas 960, wired, or wireless links as described above. For example, the transceiver 955 may represent a wireless transceiver 955 and may communicate bi-directionally with another wireless transceiver 955. The transceiver 955 may also include or be connected to a modem to modulate the packets and provide the modulated packets to for transmission, and to demodulate received packets. In some examples, transceiver 955 may be tuned to operate at specified frequencies. For example, a modem can configure the transceiver 955 to operate at a specified frequency and power level based on the communication protocol used by the modem.

Processing system 905 may be configured to perform processing functions for communications device 900, including processing signals received and/or to be transmitted by communications device 900. Processing system 905 includes one or more processors 910 coupled to a computer-readable medium 930/memory via a bus 950.

In some examples, one or more processors 910 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 910 are configured to operate a memory array using a memory controller. In other cases, a memory controller is integrated into the one or more processors 910. In some cases, the one or more processors 910 are configured to execute computer-readable instructions stored in a memory to perform various functions. In some aspects, one or more processors 910 include special purpose components for modem processing, baseband processing, digital signal processing, or transmission processing.

In certain aspects, computer-readable medium 930/memory is configured to store instructions (e.g., computer-executable code) that when executed by the one or more processors 910, cause the one or more processors 910 to perform the operations illustrated in FIGS. 6 and/or 7, or other operations for performing the various techniques discussed herein.

In one aspect, computer-readable medium 930 includes (e.g., stores) DCI code 935, uplink control information code 940, and PUCCH configuration code 945.

Examples of a computer-readable medium 930/memory include random access memory (RAM), read-only memory (ROM), solid state memory, a hard drive, a hard disk drive, etc. In some examples, computer-readable medium 930/memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 900 may provide means for performing the methods described herein, including with respect to FIGS. 6 and/or 7.

In some examples, means for transmitting or sending (or means for outputting for transmission) may include the transceivers 254 and/or antenna(s) 252 of the user equipment 104 illustrated in FIG. 2 and/or transceiver 955 and antenna 960 of the communication device in FIG. 9.

In some examples, means for receiving (or means for obtaining) may include the transceivers 254 and/or antenna(s) 252 of the user equipment 104 illustrated in FIG. 2 and/or transceiver 955 and antenna 960 of the communication device in FIG. 9.

In some examples, means for applying may include various processing system 905 components, such as: the one or more processors 910 in FIG. 9, or aspects of the user equipment 104 depicted in FIG. 2, including receive processor 258, transmit processor 264, TX MIMO processor 266, and/or controller/processor 280.

In one aspect, one or more processors 910 include DCI circuitry 915, uplink control information circuitry 920, and PUCCH configuration circuitry 925.

According to some aspects, DCI circuitry 915 receives a DCI scheduling a downlink transmission for the UE, the DCI including a PRI indicating an uplink resource for the UE to use to transmit feedback information regarding the downlink transmission. In some examples, the uplink resource is associated with a first PUCCH resource set, where the uplink control information is associated with a second PUCCH resource set, where the PRI further includes an index value, where the index value is associated with the uplink resource in the first PUCCH resource set, and where the index value is associated with a second uplink resource for transmitting the uplink control information in the second PUCCH resource set, where the number of times is based on the PRI based on the number of times being associated with the second uplink resource.

In some examples, the first PUCCH resource set includes a first set of uplink resources ordered by index value and the second PUCCH resource set includes a second set of uplink resources ordered by index value, and where the uplink resource has a same relative index position in the first PUCCH resource set as the second uplink resource has in the second PUCCH resource set. In some examples, the first PUCCH resource set includes a first set of uplink resources ordered by index value and the second PUCCH resource set includes a second set of uplink resources ordered by index value, and where the uplink resource has a different relative index position in the first PUCCH resource set as the second uplink resource has in the second PUCCH resource set. In some examples, DCI circuitry 915 receives a configuration associating the second uplink resource with the index value.

According to some aspects, uplink control information circuitry 920 transmits, repeatedly a number of times, uplink control information different than the feedback information regarding the downlink transmission, where the number of times is based on the PRI. In some examples, the number of times is associated with the uplink resource, and where the number of times is based on the PRI based on the uplink control information being associated with a same PUCCH resource set as the uplink resource indicated by the PRI.

According to some aspects, PUCCH configuration circuitry 925 receives a configuration associated with the uplink control information, where the number of times is further based on the configuration associated with the uplink control information. In some examples, the configuration is one of SPS configuration or CSI report setting. In some examples, the configuration indicates an operation to apply to the PRI, where a result of the operation indicates a second uplink resource for transmitting the uplink control information, and where the number of times is based on the PRI based on the second uplink resource being associated with the number of times. In some examples, the operation includes a cyclic shift. In some examples, the uplink resource is associated with a second number of times, and where the number of times is based on the second number of times. In some examples, PUCCH configuration circuitry 925 receives a configuration indicating a scaling factor to apply to the second number of times to derive the number of times. In some examples, PUCCH configuration circuitry 925 applies the number of times for repetition of transmissions for a configured time period or until a new configuration for repetition of transmissions is received.

Notably, FIG. 9 is just use example, and many other examples and configurations of communication device are possible.

Figure 10:
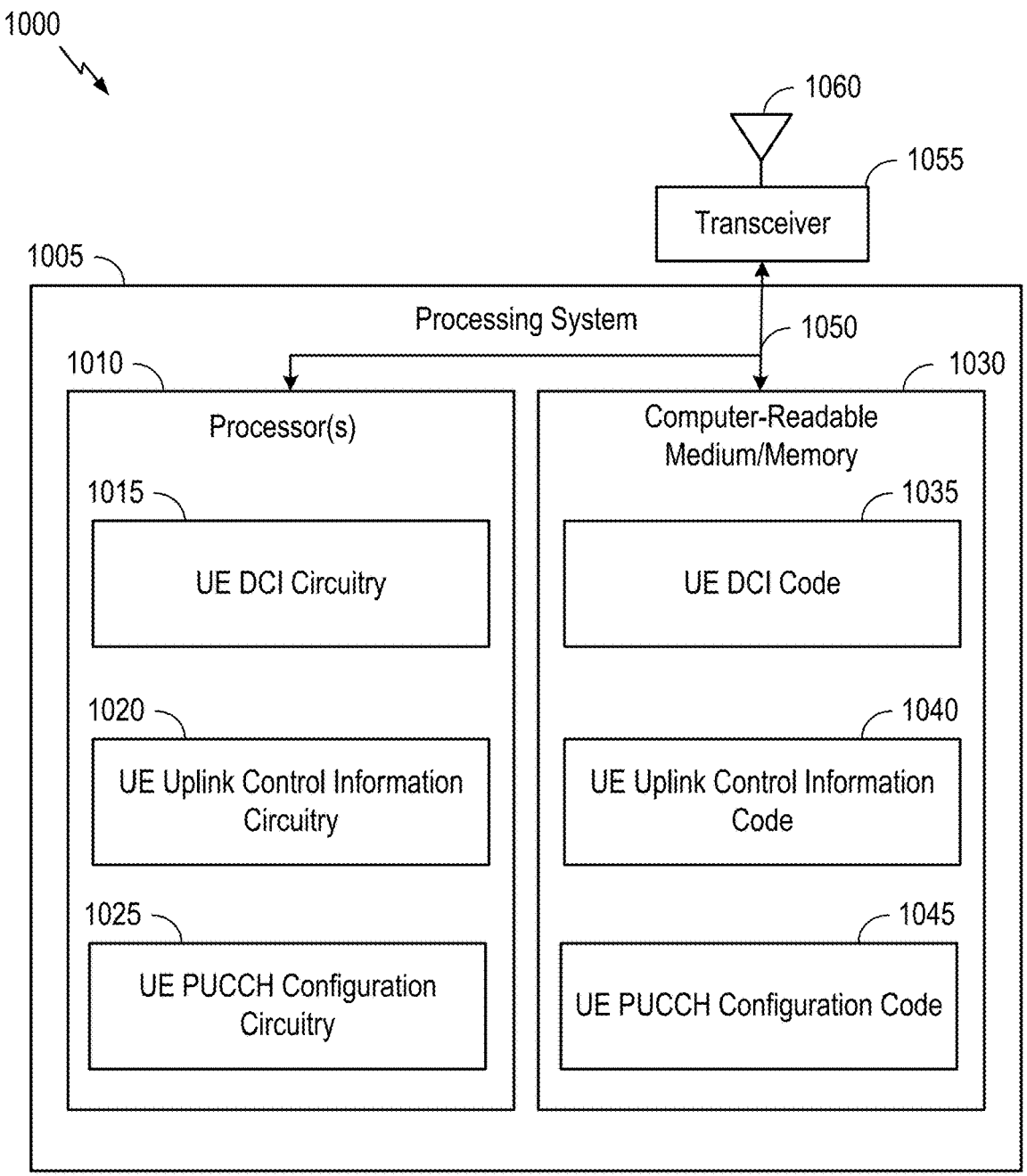

FIG. 10 depicts an example communications device 1000 that includes various components operable, configured, or adapted to perform operations for the techniques disclosed herein, such as the operations depicted and described with respect to FIGS. 6 and/or 8. In some examples, communication device may be a base station 102 as described, for example with respect to FIGS. 1 and 2.

Communications device 1000 includes a processing system 1005 coupled to a transceiver 1055 (e.g., a transmitter and/or a receiver). Transceiver 1055 is configured to transmit (or send) and receive signals for the communications device 1000 via an antenna 1060, such as the various signals as described herein. In some examples, transceiver 1055 is an example of, or includes aspects of, the corresponding element described with reference to FIG. 9.

Processing system 1005 may be configured to perform processing functions for communications device 1000, including processing signals received and/or to be transmitted by communications device 1000. Processing system 1005 includes one or more processors 1010 coupled to a computer-readable medium 1030/memory via a bus 1050. In certain aspects, computer-readable medium 1030/memory is configured to store instructions (e.g., computer-executable code) that when executed by the one or more processors 1010, cause the one or more processors 1010 to perform the operations illustrated in FIGS. 6 and/or 8, or other operations for performing the various techniques discussed herein.

In some examples, computer-readable medium 1030 is an example of, or includes aspects of, the corresponding element described with reference to FIG. 9. In one aspect, computer-readable medium 1030 includes UE DCI code 1035, UE uplink control information code 1040, and UE PUCCH configuration code 1045.

Various components of communications device 1000 may provide means for performing the methods described herein, including with respect to FIGS. 6 and/or 8.

In some examples, means for transmitting or sending (or means for outputting for transmission) may include the transceivers 232 and/or antenna(s) 234 of the base station 102 illustrated in FIG. 2 and/or transceiver 1055 and antenna 1060 of the communication device in FIG. 10.

In some examples, means for receiving (or means for obtaining) may include the transceivers 232 and/or antenna(s) 234 of the base station 102 illustrated in FIG. 2 and/or transceiver 1055 and antenna 1060 of the communication device in FIG. 10.

In some examples, one or more processors 1010 are examples of, or include aspects of, the corresponding element described with reference to FIG. 9. In one aspect, one or more processors 1010 includes UE DCI circuitry 1015, UE uplink control information circuitry 1020, and UE PUCCH configuration circuitry 1025.

According to some aspects, UE DCI circuitry 1015 transmits a DCI scheduling a downlink transmission for a UE, the DCI including a PRI indicating an uplink resource for the UE to use to transmit feedback information regarding the downlink transmission. In some examples, the uplink resource is associated with a first PUCCH resource set, where the uplink control information is associated with a second PUCCH resource set, where the PRI further includes an index value, where the index value is associated with the uplink resource in the first PUCCH resource set, and where the index value is associated with a second uplink resource for transmitting the uplink control information in the second PUCCH resource set, where the number of times is based on the PRI based on the number of times being associated with the second uplink resource.

In some examples, the first PUCCH resource set includes a first set of uplink resources ordered by index value and the second PUCCH resource set includes a second set of uplink resources ordered by index value, and where the uplink resource has a same relative index position in the first PUCCH resource set as the second uplink resource has in the second PUCCH resource set. In some examples, the first PUCCH resource set includes a first set of uplink resources ordered by index value and the second PUCCH resource set includes a second set of uplink resources ordered by index value, and where the uplink resource has a different relative index position in the first PUCCH resource set as the second uplink resource has in the second PUCCH resource set. In some examples, UE DCI circuitry 1015 transmits a configuration associating the second uplink resource with the index value.

According to some aspects, UE uplink control information circuitry 1020 receives, repeatedly a number of times, uplink control information different than the feedback information regarding the downlink transmission, where the number of times is based on the PRI. In some examples, the number of times is associated with the uplink resource, and where the number of times is based on the PRI based on the uplink control information being associated with a same PUCCH resource set as the uplink resource indicated by the PRI.

According to some aspects, UE PUCCH configuration circuitry 1025 transmits a configuration associated with the uplink control information, where the number of times is further based on the configuration associated with the uplink control information. In some examples, the configuration is one of SPS configuration or CSI report setting. In some examples, the configuration indicates an operation to apply to the PRI, where a result of the operation indicates a second uplink resource for transmitting the uplink control information, and where the number of times is based on the PRI based on the second uplink resource being associated with the number of times. In some examples, the operation includes a cyclic shift. In some examples, the uplink resource is associated with a second number of times, and where the number of times is based on the second number of times. In some examples, UE PUCCH configuration circuitry 1025 transmits a configuration indicating a scaling factor to apply to the second number of times to derive the number of times.

Notably, FIG. 10 is just use example, and many other examples and configurations of communication device are possible.

Example Clauses

Implementation examples are described in the following numbered clauses:

Clause 1: A method for wireless communications by a UE, the method comprising: receiving a DCI scheduling a downlink transmission for the UE, the DCI comprising a PRI indicating an uplink resource for the UE to use to transmit feedback information regarding the downlink transmission; and transmitting, repeatedly a number of times, uplink control information different than the feedback information regarding the downlink transmission, wherein the number of times is based on the PRI.

Clause 2: The method of clause 1, wherein: the number of times is associated with the uplink resource, and wherein the number of times is based on the PRI based on the uplink control information being associated with a same PUCCH resource set as the uplink resource indicated by the PRI.

Clause 3: The method of any one of Clauses 1-2, further comprising: receiving a configuration associated with the uplink control information, wherein the number of times is further based on the configuration associated with the uplink control information.

Clause 4: The method of Clause 3, wherein: the configuration is one of SPS configuration or CSI report setting.

Clause 5: The method of Clause 3, wherein: the configuration indicates an operation to apply to the PRI, wherein a result of the operation indicates a second uplink resource for transmitting the uplink control information, and wherein the number of times is based on the PRI based on the second uplink resource being associated with the number of times.

Clause 6: The method of Clause 5, wherein: the operation comprises a cyclic shift.

Clause 7: The method of any one of Clauses 1-6, wherein: the uplink resource is associated with a first PUCCH resource set, wherein the uplink control information is associated with a second PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

Clause 8: The method of Clause 7, wherein: the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

Clause 9: The method of Clause 7, wherein: the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

Clause 10: The method of Clause 7, further comprising: receiving a configuration associating the second uplink resource with the index value.

Clause 11: The method of any one of Clauses 1-10, wherein: the uplink resource is associated with a second number of times, and wherein the number of times is based on the second number of times.

Clause 12: The method of Clause 11, further comprising: receiving a configuration indicating a scaling factor to apply to the second number of times to derive the number of times.

Clause 13: The method of any one of Clauses 1-12, further comprising: applying the number of times for repetition of transmissions for a configured time period or until a new configuration for repetition of transmissions is received.

Clause 14: A method for wireless communication by a base station, the method comprising: transmitting a DCI scheduling a downlink transmission for a UE, the DCI comprising a PRI indicating an uplink resource for the UE to use to transmit feedback information regarding the downlink transmission and receiving, repeatedly a number of times, uplink control information different than the feedback information regarding the downlink transmission, wherein the number of times is based on the PRI.

Clause 15: The method of Clause 14, wherein: the number of times is associated with the uplink resource, and wherein the number of times is based on the PRI based on the uplink control information being associated with a same PUCCH resource set as the uplink resource indicated by the PRI.

Clause 16: The method of any one of Clauses 14-15, further comprising: transmitting a configuration associated with the uplink control information, wherein the number of times is further based on the configuration associated with the uplink control information.

Clause 17: The method of Clause 16, wherein: the configuration is one of SPS configuration or CSI report setting.

Clause 18: The method of Clause 16, wherein: the configuration indicates an operation to apply to the PRI, wherein a result of the operation indicates a second uplink resource for transmitting the uplink control information, and wherein the number of times is based on the PRI based on the second uplink resource being associated with the number of times.

Clause 19: The method of Clause 18, wherein: the operation comprises a cyclic shift.

Clause 20: The method of any one of Clauses 14-19, wherein: the uplink resource is associated with a first PUCCH resource set, wherein the uplink control information is associated with a second PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

Clause 21: The method of Clause 20, wherein: the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

Clause 22: The method of Clause 20, wherein: the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

Clause 23: The method of Clause 20, further comprising: transmitting a configuration associating the second uplink resource with the index value.

Clause 24: The method of any one of Clauses 14-23, wherein: the uplink resource is associated with a second number of times, and wherein the number of times is based on the second number of times.

Clause 25: The method of Clause 24, further comprising: transmitting a configuration indicating a scaling factor to apply to the second number of times to derive the number of times.

Clause 26: A processing system, comprising: a memory; and one or more processors coupled to the memory, wherein the memory and the one or more processors are configured to perform a method in accordance with any one of Clauses 1-25.

Clause 27: A processing system, comprising means for performing a method in accordance with any one of Clauses 1-25.

Clause 28: A non-transitory computer-readable medium comprising computer-executable instructions that, when executed by one or more processors of a processing system, cause the processing system to perform a method in accordance with any one of Clauses 1-25.

Clause 29: A computer program product embodied on a computer-readable storage medium comprising code for performing a method in accordance with any one of Clauses 1-25.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of dynamic uplink control channel repetition factor indication in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
  memory; and
  one or more processors coupled to the memory, the one or more processors, individually or collectively, being configured to:
    receive a downlink control information (DCI) scheduling a downlink transmission for the UE, the DCI comprising a physical uplink control channel (PUCCH) resource indicator (PRI) indicating an uplink resource for the UE to use to transmit feedback information regarding the downlink transmission, wherein the uplink resource is associated with a first PUCCH resource set; and
    transmit, repeatedly a number of times, uplink control information different than the feedback information regarding the downlink transmission, wherein the number of times is based on the PRI, wherein the uplink control information is associated with a second PUCCH resource set different than the first PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

2. The UE of claim 1, wherein the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

3. The UE of claim 1, wherein the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

4. The UE of claim 1, wherein the one or more processors, individually or collectively, are further configured to receive a configuration associating the second uplink resource with the index value.

5. The UE of claim 1, wherein the one or more processors, individually or collectively, are further configured to apply the number of times for repetition of transmissions for a configured time period or until a new configuration for repetition of transmissions is received.

6. A base station (BS), comprising:
memory; and
one or more processors coupled to the memory, the one or more processors, individually or collectively, being configured to:
    transmit a downlink control information (DCI) scheduling a downlink transmission for a user equipment (UE), the DCI comprising a physical uplink control channel (PUCCH) resource indicator (PRI) indicating an uplink resource for the UE to use to transmit feedback information regarding the downlink transmission, wherein the uplink resource is associated with a first PUCCH resource set; and
    receive, repeatedly a number of times, uplink control information different than the feedback information regarding the downlink transmission, wherein the number of times is based on the PRI, wherein the uplink control information is associated with a second PUCCH resource set different than the first PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

7. The BS of claim 6, wherein the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

8. The BS of claim 6, wherein the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

9. The BS of claim 6, wherein the one or more processors, individually or collectively, are further configured to transmit a configuration associating the second uplink resource with the index value.

10. A method for wireless communication by a user equipment (UE), the method comprising:
    receiving a downlink control information (DCI) scheduling a downlink transmission for the UE, the DCI comprising a physical uplink control channel (PUCCH) resource indicator (PRI) indicating an uplink resource for the UE to use to transmit feedback information regarding the downlink transmission, wherein the uplink resource is associated with a first PUCCH resource set; and
    transmitting, repeatedly a number of times, uplink control information different than the feedback information regarding the downlink transmission, wherein the number of times is based on the PRI, wherein the uplink control information is associated with a second PUCCH resource set different than the first PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

11. The method of claim 10, wherein the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

12. The method of claim 10, wherein the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

13. The method of claim 10, further comprising receiving a configuration associating the second uplink resource with the index value.

14. A method for wireless communication by a base station (BS), the method comprising:
    transmitting a downlink control information (DCI) scheduling a downlink transmission for a user equipment (UE), the DCI comprising a physical uplink control channel (PUCCH) resource indicator (PRI) indicating an uplink resource for the UE to use to transmit feedback information regarding the downlink transmission, wherein the uplink resource is associated with a first PUCCH resource set; and
    receiving, repeatedly a number of times, uplink control information different than the feedback information regarding the downlink transmission, wherein the number of times is based on the PRI, wherein the uplink control information is associated with a second PUCCH resource set different than the first PUCCH resource set, wherein the PRI further comprises an index value, wherein the index value is associated with the uplink resource in the first PUCCH resource set, and wherein the index value is associated with a second uplink resource for transmitting the uplink control information in the second PUCCH resource set, wherein the number of times is based on the PRI based on the number of times being associated with the second uplink resource.

15. The method of claim 14, wherein the first PUCCH resource set comprises a first plurality of uplink resources ordered by index value and the second PUCCH resource set comprises a second plurality of uplink resources ordered by index value, and wherein the uplink resource has a same relative index position in the first PUCCH resource set as the second uplink resource has in the second PUCCH resource set.

16. The method of claim 14, wherein the first PUCCH resource set comprises a first plurality of uplink resources ordered by index value and the second PUCCH resource set comprises a second plurality of uplink resources ordered by index value, and wherein the uplink resource has a different relative index position in the first PUCCH resource set as the second uplink resource has in the second PUCCH resource set.

17. The method of claim 14, further comprising transmitting a configuration associating the second uplink resource with the index value.

* * * * *